(12) United States Patent
Liu et al.

(10) Patent No.: US 8,400,988 B2
(45) Date of Patent: Mar. 19, 2013

(54) SYSTEM AND METHOD FOR PARALLEL TRANSMISSION OVER MULTIPLE RADIO LINKS

(75) Inventors: Xiaoyu Liu, Yongin-si (KR); Mi-Sun Do, Suwon-si (KR); Yongsuk Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 946 days.

(21) Appl. No.: 11/699,545

(22) Filed: Jan. 30, 2007

(65) Prior Publication Data

US 2007/0206529 A1     Sep. 6, 2007

(30) Foreign Application Priority Data

Mar. 3, 2006   (KR) .......................... 10-2006-0020490

(51) Int. Cl.
*H04W 4/00*   (2009.01)
*H04M 1/00*   (2006.01)

(52) U.S. Cl. .................. 370/338; 455/550.1; 455/552.1; 455/553.1; 370/912; 370/913

(58) Field of Classification Search .................. 370/338, 370/912–913; 455/550.1, 552.1, 553.1, 127.4, 455/553
See application file for complete search history.

(56) References Cited

U.S. PATENT DOCUMENTS

| | | | |
|---|---|---|---|
| 6,512,747 B1 * | 1/2003 | Umeuchi et al. ........... | 370/310.1 |
| 7,752,519 B2 | 7/2010 | Yeo et al. | |
| 7,986,633 B2 * | 7/2011 | Ryu et al. .................. | 370/252 |
| 2003/0095534 A1 * | 5/2003 | Jiang .............................. | 370/346 |
| 2004/0081081 A1 * | 4/2004 | Colombo ...................... | 370/216 |
| 2004/0100929 A1 | 5/2004 | Garcia-Luna-Aceves | |
| 2004/0156345 A1 | 8/2004 | Steer et al. | |

(Continued)

FOREIGN PATENT DOCUMENTS

KR   10-2005-0069902 A      7/2005
WO   WO 2005060210 A1 *     6/2005

OTHER PUBLICATIONS

Koudouridis et al., "Generic Link Layer Functionality for Multi-Radio Access Networks", 14th IST Mobile & Wireless Communication Summit—Jun. 2005.*

(Continued)

*Primary Examiner* — Jean Gelin
*Assistant Examiner* — Dung Hong
(74) *Attorney, Agent, or Firm* — NSIP Law

(57) ABSTRACT

A radio communication system and transmission method using Multi-Radio Access (MRA) interfaces are provided. The radio communication system and method include a transmitter and a receiver having at least two Radio Access (RA) interfaces capable of communicating through different frequency spectrums, in which each of the transmitter and the receiver includes a multiple radio transmission layer for activating a multiple radio transmission entity for each upper layer service and transmitting data in packet units and an RA layer for activating at least one RA entity that manages the RA interface for the multiple radio transmission entity and dividing a packet into sub-packets for transmission and reception. In the transmission method, the multiple radio transmission entity of the transmitter receives a packet transmission success indicator for a specific packet from the RA entity of the transmitter and a next packet is transmitted upon receipt of the packet transmission success indicator. In the transmission method, a link having a good channel status is selected as a retransmission channel according to the status of an RA link of the lower layer, thereby allowing efficient and rapid data transmission.

16 Claims, 4 Drawing Sheets

U.S. PATENT DOCUMENTS

2004/0185887 A1      9/2004   Wolman et al.
2009/0122765 A1*     5/2009   Dimou et al. .................. 370/336
2009/0252236 A1*    10/2009   Li et al. ......................... 375/260

OTHER PUBLICATIONS

Fairhurst et al., "Advice to link designers on link Automatic Repeat reQuest (ARQ)", RFC 3366, Aug. 2002.*

Koudouridis, G. P. et al. (Jun. 19, 2005). "Generic Link Layer Functionality for Multi-Radio Access Networks." 14$^{th}$ IST Mobile and Wireless Communications Summit, Jun. 19-22, 2005.

Korean Office Action dated Jul. 18, 2012, issued in counterpart Korean Patent Application No. 10-2006-0020490. 4 pages.

* cited by examiner

SYSTEM AND METHOD FOR PARALLEL TRANSMISSION OVER MULTIPLE RADIO LINKS

CROSS-REFERENCE TO RELATED APPLICATIONS

This application claims priority under 35 U.S.C. §119 to application Serial No. 2006-20490 filed in the Korean Intellectual Property Office on Mar. 3, 2006, the entire disclosure of which is hereby incorporated by reference.

BACKGROUND OF THE INVENTION

1. Field of the Invention

The present invention generally relates to a radio communication system In particular, the present invention relates to a system and method for parallel transmission using Multi-Radio Access (MRA) interfaces in a system that supports MRA communication.

2. Description of the Related Art

Wireless mesh is a new wireless network technique for overcoming limitations of a conventional Wireless Local Area Network (WLAN). It is expected to play an important role as a next-generation low-power radio technique with far reaching implementation.

In the conventional WLAN, a plurality of computers are connected around an Access Point (AP) and a network is configured in a point-to-point or a point-to-multipoint manner. However, in a mesh network, devices having wireless functions also communicate with one another, thereby improving the reliability of the mesh network and allowing expansion using low power.

The mesh network is a multi-hop wireless network that can provide broadband Internet access. As such, its importance gradually increases. In a mesh network, nodes do not move at all or move a little and do not depend on battery power. Thus, research is being actively conducted on methods for improving network capacity instead of increasing mobility or reducing power consumption.

Multi-Radio Access (MRA) has emerged as an approach to provide the best resource to meet users' demands by sharing all network resources such as frequency spectrum and network components. However, a detailed method for implementing MRA has not yet been suggested.

In a current multi-hop network, advantages of an MRA interface are not fully used. Even when the MRA interface is supported, efficient transmission using at least two radio access links cannot be provided because different retransmission mechanisms are used between layers.

Accordingly, there is a need for an improved system and method for parallel transmission over multiple radio links.

SUMMARY OF THE INVENTION

Exemplary embodiments of the present invention address at least the above problems and/or disadvantages and provide at least the advantages described below. Accordingly, an aspect of the present invention is to provide a system and method capable of optimizing system performance by efficiently using heterogeneous MRA interfaces according to a communication environment.

According to one exemplary aspect of the present invention, there is provided a transmission system and method for radio communication a transmitter and a receiver having at least two Radio Access (RA) interfaces capable of communicating through different frequency spectrums, in which each of the transmitter and the receiver includes a multiple radio transmission layer for activating a multiple radio transmission (MRT) entity for each upper layer service and transmitting data in packet units and an RA layer for activating at least one RA entity that manages the RA interface for the multiple radio transmission entity and dividing a packet into sub-packets for transmission and reception. In the transmission method, the multiple radio transmission entity of the transmitter receives a packet transmission success indicator for a specific packet from the RA entity of the transmitter and a next packet is transmitted upon receipt of the packet transmission success indicator.

In an exemplary embodiment, upon receipt of a request for retransmission of a packet from the receiver, the MRT entity of the transmitter retransmits the requested packet.

In an exemplary embodiment, the step of receiving the packet transmission success indicator includes the steps of the MRT entity of the receiver sensing reception of the specific packet, transmitting the packet transmission success indicator to the RA entity of the receiver, and upon receipt of the packet transmission success indicator, the RA entity of the receiver transmitting a packet transmission success indicator to the RA entity of the transmitter.

In an exemplary embodiment, the step of receiving the packet transmission success indicator includes the steps of the MRT entity of the receiver sensing a failure in reception of the specific packet, transmitting a packet reception failure indicator to the RA entity of the receiver, and upon receipt of the packet reception failure indicator, the RA entity of the receiver transmitting a request for retransmission of the packet to the RA entity of the transmitter.

In an exemplary embodiment, the step of sensing the failure in reception of the specific packet includes the steps of receiving sub-packets of the specific packet from the RA entity of the receiver and discarding the specific packet if the order of serial numbers of the sub-packets is not correct.

BRIEF DESCRIPTION OF THE DRAWINGS

The above and other objects, features and advantages of certain embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

Exemplary embodiments of the present invention will now be described in detail with reference to the annexed drawings.

In the following description, a detailed description of known functions and configurations incorporated herein has been omitted for clarity and conciseness.

Figure 1A:
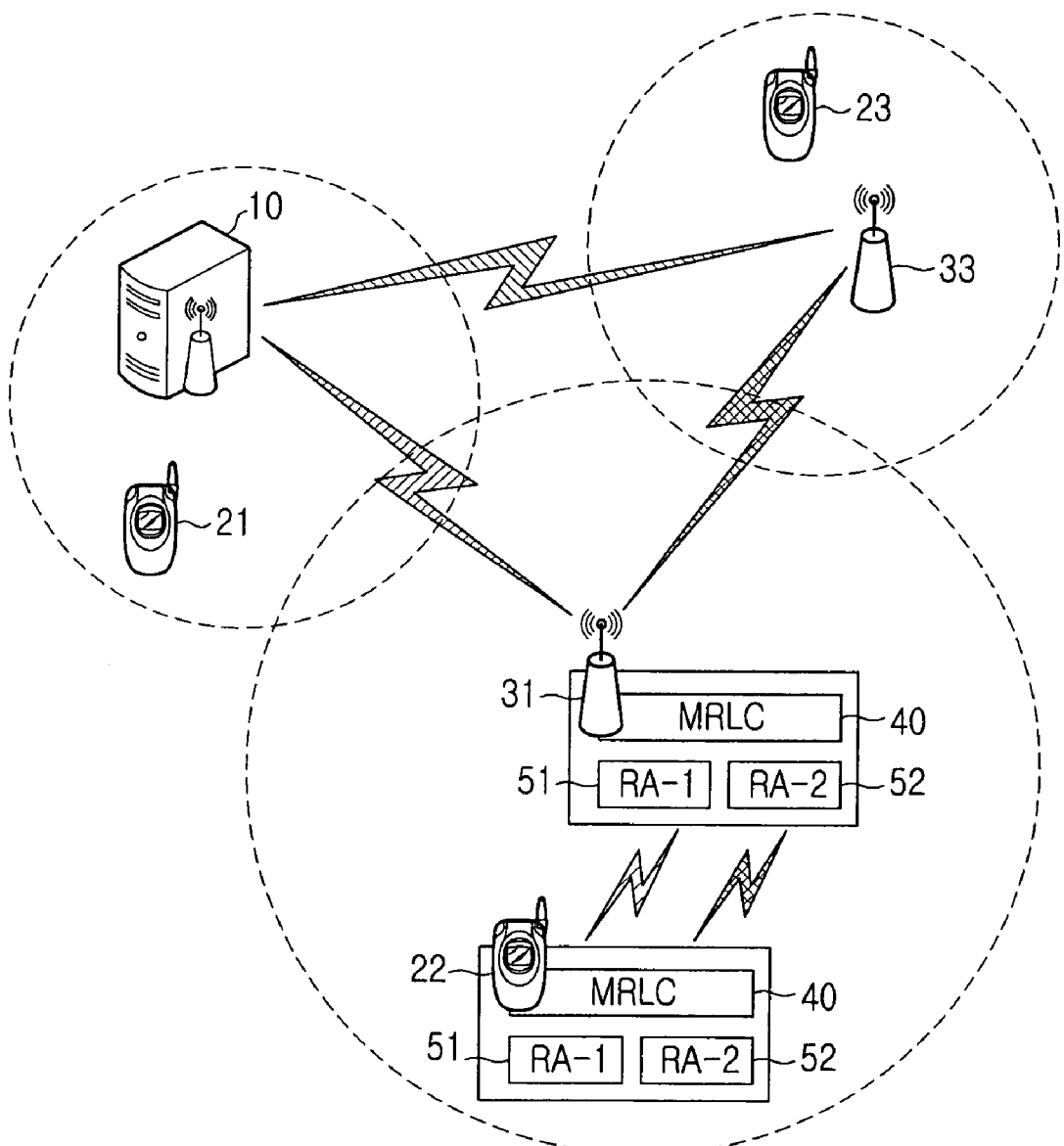
FIG. 1A schematically illustrates a system environment to which a transmission method over multiple radio links according to an exemplary embodiment of the present invention is applied.

FIG. 1A schematically illustrates a system environment to which a transmission method over multiple radio links according to an exemplary embodiment of the present invention is applied. The system environment includes a base station 10, terminals 21, 22, and 23, and relaying stations 31 and 33 that extend the coverage of the base station 10. The base station 10 and the relaying stations 31 and 33 can communicate over the same radio link or different radio links and the terminals 21, 22, and 23 communicate through the base station 10 or the relaying stations 31 and 33. In an exemplary embodiment of the present invention, the relaying station 31 and the terminal 22 communicate over two radio links and there exists a Multiple Radio Link Control (MRLC) layer and a Radio Access (RA) layer for supporting a plurality of RA interfaces.

A single MRLC entity 40 is activated for a single upper layer service in the MRLC layer, and a plurality of RA entities 51 and 52 are activated for the MRLC entity 40 in the RA layer. Thus, the relaying station 31 and the terminal 22 can prevent a bottleneck phenomenon and efficiently manage resources by communicating over two radio links.

Figure 1B:
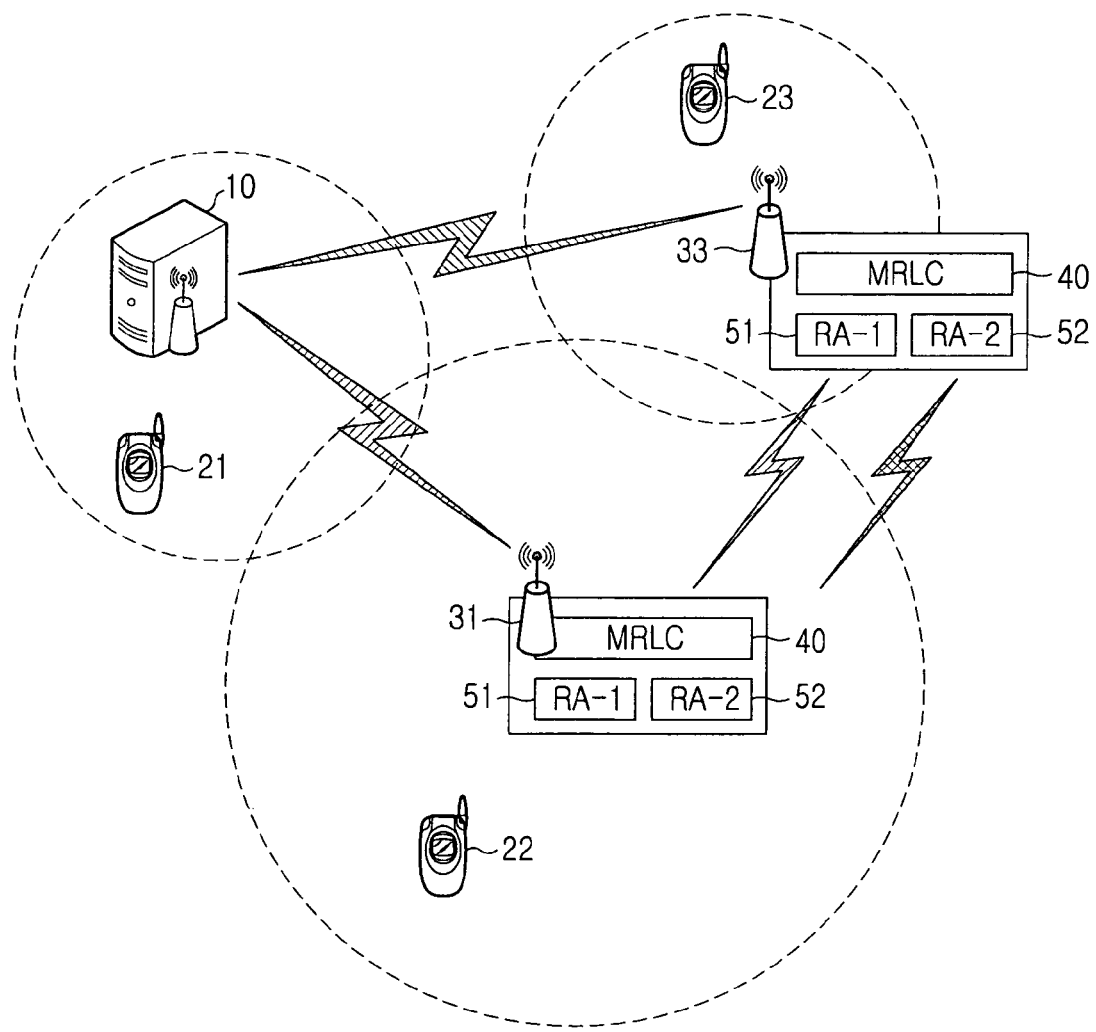
FIG. 1B schematically illustrates another system environment to which a transmission method over multiple radio links according to an exemplary embodiment of the present invention is applied.

FIG. 1B schematically illustrates another system environment to which a transmission method over multiple radio links according to an exemplary embodiment of the present invention is applied, in which MRA communication between the relaying stations 31 and 33, instead of between the relaying station 31 and the terminal 22, is shown. Like in FIG. 1A, communication is performed over at least one radio link when necessary, thereby increasing system capacity.

Figure 2:
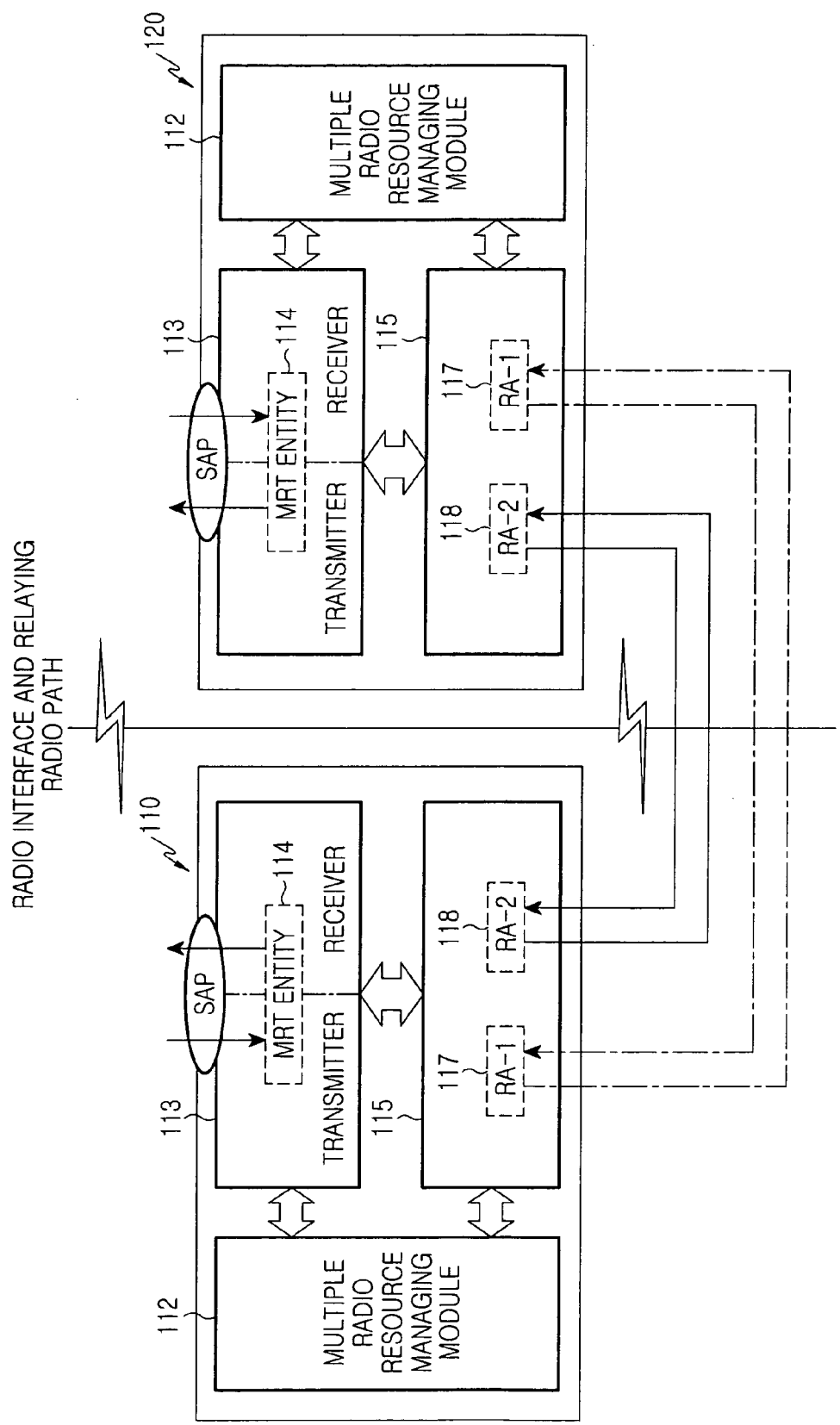
FIG. 2 is a conceptual view for explaining a transmission method over multiple radio links, used by a radio communication system according to an exemplary embodiment of the present invention.

FIG. 2 is a conceptual view for explaining a transmission method over multiple radio links, used by a radio communication system according to an exemplary embodiment of the present invention.

In FIG. 2, transceivers in the radio communication system according to an exemplary embodiment of the present invention operate MRA interfaces through their MRLC layers 110 and 120, respectively.

Each of the MRLC layers 110 and 120 of the transceivers includes a Multiple Radio Transmission (MRT) sub-layer 113 for processing upper layer data and an RA sub-layer 115 for transmitting the upper layer data processed and transmitted from the MRT sub-layer 113 through a radio link and transmitting a signal received over the radio link to the MRT sub-layer 113.

In the MRT sub-layer 113, a single MRT entity 114 manages transmission and reception for a single upper layer service. In the RA sub-layer 115, a plurality of RA entities 117 and 118 may be activated for the single MRT entity 114 according to a communication environment. The RA entities 117 and 118 correspond to radio interfaces that manage different radio frequency spectrums. For example, when the first RA entity 117 manages an 802.11 radio interface, the second RA entity 118 may manage an 802.16 radio interface.

The MRLC layer 110 includes a multiple radio resource managing module 112 for controlling the MRT sub-layer 113 and the RA sub-layer 115 to manage the MRT sub-layer 113 and the RA sub-layer 115.

In the radio communication system as structured above, the transmission method according to an exemplary embodiment of the present invention uses two-level signaling mechanisms for retransmission. First is a remote ACK message between MRT layers, in which a MRT packet retransmission request is transmitted to an MRT entity of a transmitter for error correction if an MRT entity of a receiver fails to receive a packet. Second is a transmission confirmation mechanism by a lower layer, in which RA entities operate according to different retransmission mechanisms and an upper MRT entity is informed of successful transmission of a packet upon receipt of an RA layer ACK message from a peer RA entity of a receiver.

Figure 3:
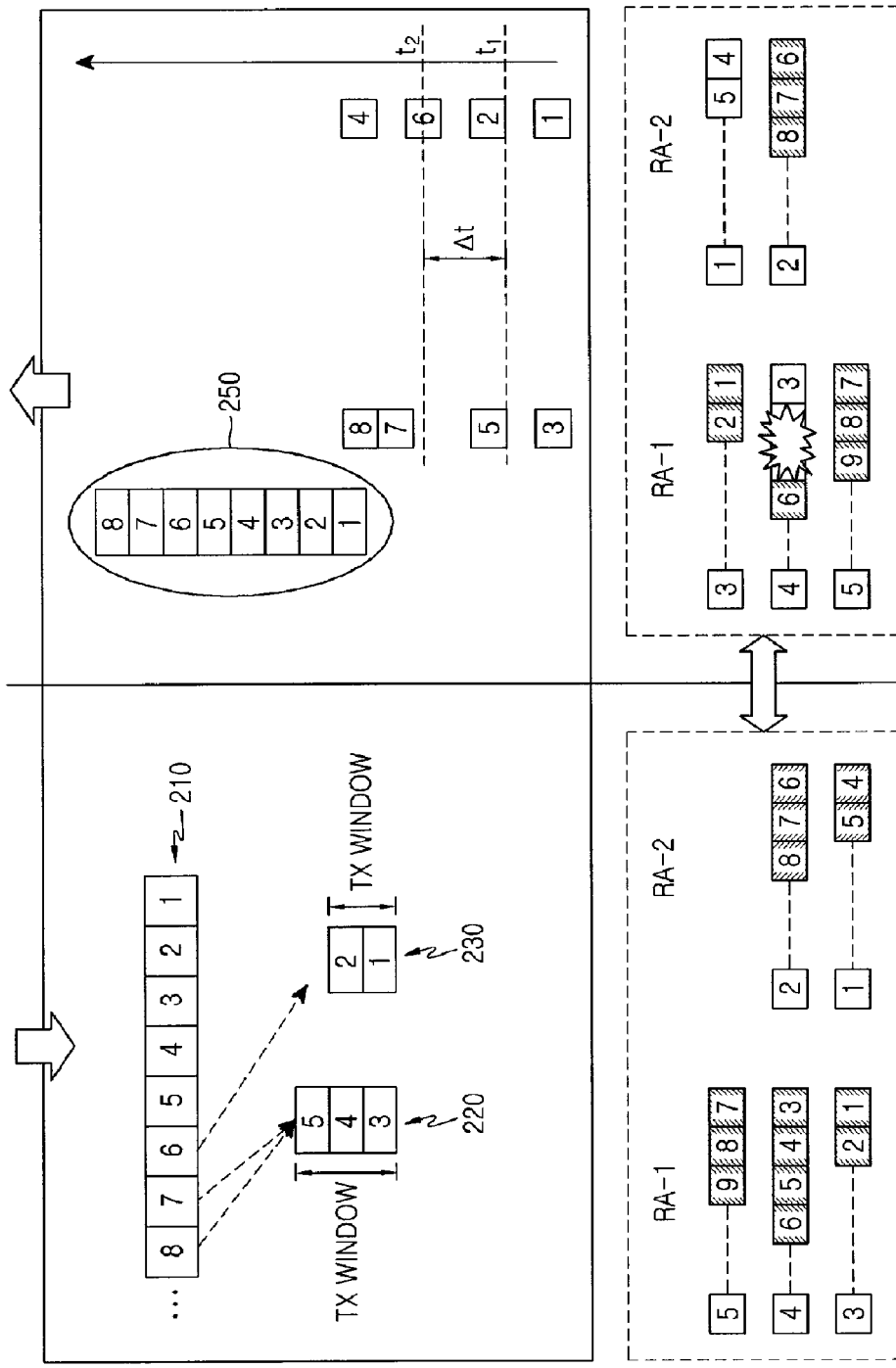
FIG. 3 is a conceptual view for explaining a signaling mechanism for retransmission in a transmission method over multiple radio links according to an exemplary embodiment of the present invention.

FIG. 3 is a conceptual view for explaining a signaling mechanism for retransmission in a transmission method over multiple radio links according to an exemplary embodiment of the present invention.

In FIG. 3, an MRT entity activated for a single service includes a single retransmission buffer 210 and transmission buffers 220 and 230 for two RA entities used for the service. Since the number of RA entities activated for a single MRT entity is determined by a wireless environment, the number of transmission buffers is determined by the number of RA entities.

The MRT entity is a predetermined pattern based on a channel environment of each RA interface and transmits packets stored in the retransmission buffer 210 to the transmission buffers 220 and 230 for the RA entities. Third, fourth, and fifth packets are stored in the first transmission buffer 220 for the first RA entity and first and second packets are stored in the second transmission buffer 230 for the second RA entity.

The packets are divided into sub-packets according to a division pattern of a corresponding RA entity and then transmitted through a corresponding radio interface. For example, the third, fourth, and fifth packets to be serviced by the first RA entity are divided into first through ninth RA-1 sub-packets and the first and second packets to be serviced by the second RA entity are divided into fourth through eighth RA-2 sub-packets.

The MRT entity of the receiver corresponding to the MRT entity of the transmitter includes a reception buffer 250 for arranging packets transmitted from the MRT entity of the transmitter and transmitting the packets to an upper layer. The RA sub-layer of the receiver includes a first RA entity and a second RA entity for RA entities of the receiver and restores sub-packets received from the peer RA entity of the transmitter into packet units for transmission to an upper MRT entity.

In FIG. 3, the fourth and fifth sub-packets from among the sub-packets transmitted through the first RA entity of the transmitter are not received and the first RA entity of the receiver transmits a request for retransmission of the fourth and fifth sub-packets to the first RA entity of the transmitter. The first and second RA entities operate through separate retransmission mechanisms.

In view of the MRT layer, the MRT entity of the transmitter recognizes a failure in transmission of the fourth packet including the fourth and fifth sub-packets transmitted through the first RA entity at the time of receiving a NACK message with respect to the fourth packet from the MRT entity of the receiver. The MRT entity of the receiver transmits a NACK message at $t_2$, in other words when a timer expires after the reception of the fifth packet.

In an exemplary embodiment of the present invention, at the time of receiving the fourth packet, in other words at $t_1$, the MRT entity of the receiver informs the first RA entity that the fourth packet is not received and requests retransmission of the fourth packet. The RA entity of the receiver transmits an ACK message for successful reception to the peer RA entity of the transmitter, and the RA entity that receives the ACK message informs the MRT entity of the successful reception and prepares for transmission of a next packet.

As such, by simultaneously checking a failure in packet reception and performing retransmission to a lower layer, the time required for transmission of a retransmission message can be reduced by at least Δt.

As described above, in a parallel transmission method using MRA interfaces according to exemplary embodiments of the present invention, system capacity and relaying capacity can be increased or adjusted by using at least one radio interface.

Moreover, in the parallel transmission method using MRA interfaces according to exemplary embodiments of the present invention, successful transmission of an upper layer packet is informed by signaling for each RA entity of a lower layer, thereby allowing rapid packet transmission.

Furthermore, according to exemplary embodiments of the present invention, a link having a good channel status is selected as a retransmission channel according to the status an RA link of the lower layer, thereby allowing efficient and rapid data transmission.

While the present invention has been shown and described with reference to exemplary embodiments thereof, it will be understood by those skilled in the art that various changes in form and details may be made therein without departing from the spirit and scope of the invention and the full scope of equivalents thereof.

What is claimed is:

1. A transmission method for a Multiple Radio Transmission (MRT) entity of a transmitter in a radio communication system comprising the transmitter and a receiver, the transmission method comprising:
   transmitting, to a MRT entity of the receiver, data in packets comprising a first packet and a second packet;
   receiving, from the MRT entity of the receiver, a request for retransmission of the first packet at a time of the transmission of the first packet; and
   receiving, from the MRT entity of the receiver, a negative-acknowledge (NACK) message with respect to the transmission of the first packet after the transmission of the first packet and the second packet,
   wherein the transmitter comprises
      a MRT sub-layer comprising the MRT entity for an upper layer service, and
      a Radio Access (RA) sub-layer comprising at least two RA entities configured to manage at least two RA interfaces, respectively, the at least two RA interfaces configured to communicate through different frequency spectrums, respectively,
   wherein the MRT entity of the transmitter is configured to transmit, to the at least two RA entities, the packets, which are assigned differently among the at least two RA entities, and
   wherein the at least two RA entities are further configured to divide the respective packets into sub-packets for transmission.

2. The transmission method of claim 1, further comprising:
   retransmitting, to the MRT entity of the receiver, the first packet upon receipt of the request for retransmission of the first packet.

3. The transmission method of claim 1, wherein:
   the MRT entity of the transmitter comprises a retransmission buffer.

4. The transmission method of claim 3, wherein:
   the MRT entity of the transmitter further comprises at least one transmission buffer.

5. The transmission method of claim 3, wherein:
   the at least two RA entities operate based on different retransmission mechanisms, respectively.

6. The transmission method of claim 1, wherein:
   the at least two RA entities operate based on different retransmission mechanisms, respectively.

7. The transmission method of claim 1, further comprising:
   receiving, from the MRT entity of the receiver, a packet transmission success indicator; and
   transmitting, to the MRT entity of the receiver, a next packet upon receipt of the packet transmission success indicator.

8. The transmission method of claim 1, further comprising:
   simultaneously determining a failure in the transmission of the first packet based on the NACK message, and retransmitting, to the MRT entity of the receiver, the first packet based on the request for retransmission of the first packet.

9. A radio communication system comprising:
   a transmitter; and
   a receiver,
   wherein each of the transmitter and the receiver comprise
      a Multiple Radio Transmission (MRT) sub-layer comprising an MRT entity for an upper layer service, and
      a Radio Access (RA) sub-layer comprising at least two RA entities configured to manage at least two RA interfaces, respectively, the at least two RA interfaces configured to communicate through different frequency spectrums, respectively,
   wherein the MRT entity is configured to transmit and receive, to and from the at least two RA entities, data in packets, which are assigned differently among the at least two RA entities,
   wherein the at least two RA entities are further configured to
      divide the respective packets into sub-packets for transmission, and
      combine the sub-packets into the respective packets for reception,
   wherein the MRT entity of the transmitter is further configured to transmit, to the MRT entity of the receiver, the packets comprising a first packet and a second packet, and
   wherein the MRT entity of the receiver is further configured to
      transmit, to the MRT entity of the transmitter, a request for transmission of the first packet at a time of the transmission of the first packet, and
      transmit, to the MRT entity of the transmitter, a negative-acknowledge (NACK) message with respect to the transmission of the first packet after the transmission of the first packet and second packet.

10. A reception method for a Multiple Radio Transmission (MRT) entity of a receiver in a radio communication system comprising a transmitter and the receiver, the reception method comprising:
   receiving, from a MRT entity of the transmitter, data in packets comprising a first packet and a second packet;
   transmitting, to the MRT entity of the transmitter, a request for retransmission of the first packet at a time of the reception of the first packet; and
   transmitting, to the MRT entity of the transmitter, a negative-acknowledge (NACK) message with respect to the reception of the first packet after the reception of the first packet and the second packet,
   wherein the receiver comprises
      a MRT sub-layer comprising the MRT entity for an upper layer service, and
      a Radio Access (RA) sub-layer comprising at least two RA entities configured to manage at least two RA interfaces, respectively, the at least two RA interfaces configured to communicate through different frequency spectrums, respectively, wherein the MRT entity of the receiver is configured to receive, from the at least two RA entities, the packets, which are assigned differently among the at least two RA entities, and wherein the at least two RA entities are further configured to combine sub-packets into the respective packets for reception.

11. The reception method of claim 10, further comprising:
determining, by the MRT entity of the receiver, a success in the reception of the first packet;
transmitting, by the MRT entity of the receiver to one of the at least two RA entities, a packet transmission success indicator; and
transmitting, by the one of the at least two RA entities to the MRT entity of the transmitter, the packet transmission success indicator upon receipt of the packet transmission success indicator.

12. The reception method of claim 10, further comprising:
determining, by the MRT entity of the receiver, a failure in the reception of the first packet;
transmitting, by the MRT entity of the receiver to one of the at least two RA entities, a packet reception failure indicator; and
transmitting, by the one of the at least two RA entities to the MRT entity of the transmitter, the request for retransmission of the first packet upon receipt of the packet reception failure indicator.

13. The reception method of claim 12, wherein the determining of the failure in the reception of the first packet comprises:
receiving, by the MRT entity of the receiver from the one of the at least two RA entities, sub-packets of the first packet; and
discarding the first packet if an order of serial numbers of the sub-packets is not correct.

14. The reception method of claim 10, further comprising:
determining a failure in the reception of the first packet; and
transmitting, to the MRT entity of the transmitter, the NACK message based on the determination of the failure in the reception of the first packet after the reception of the first packet and the second packet.

15. A transmitter comprising:
a Multiple Radio Transmission (MRT) sub-layer comprising an MRT entity for an upper layer service; and
a Radio Access (RA) sub-layer comprising at least two RA entities configured to manage at least two RA interfaces, respectively, the at least two RA interfaces configured to communicate through different frequency spectrums, respectively, wherein the MRT entity is configured to transmit, to the at least two RA entities, data in packets, which are assigned differently among the at least two RA entities, wherein the at least two RA entities are further configured to divide the respective packets into sub-packets for transmission, and wherein the MRT entity is further configured to
transmit, to a MRT entity of a receiver, the packets comprising a first packet and a second packet,
receive, from the MRT entity of the receiver, a request for retransmission of the first packet at a time of the transmission of the first packet, and
receive, from the MRT entity of the receiver, a negative-acknowledge (NACK) message with respect to the transmission of the first packet after the transmission of the first packet and the second packet.

16. A receiver comprising:
a Multiple Radio Transmission (MRT) sub-layer comprising an MRT entity for an upper layer service; and
a Radio Access (RA) sub-layer comprising at least two RA entities configured to manage at least two RA interfaces, respectively, the at least two RA interfaces configured to communicate through different frequency spectrums, respectively, wherein the MRT entity is configured to receive, from the at least two RA entities, data in packets, which are assigned differently among the at least two RA entities, wherein the at least two RA entities are further configured to combine sub-packets into the respective packets for reception, and wherein the MRT entity is further configured to
receive, from a MRT entity of a transmitter, the packets comprising a first packet and a second packet,
transmit, to the MRT entity of the transmitter, a request for retransmission of the first packet at a time of the reception of the first packet, and
transmit, to the MRT entity of the transmitter, a negative-acknowledge (NACK) message with respect to the reception of the first packet after the reception of the first packet and the second packet.

* * * * *